United States Patent
Hassan et al.

(10) Patent No.: US 11,273,903 B2
(45) Date of Patent: Mar. 15, 2022

(54) SYSTEMS AND METHODS FOR CONTROLLING AN AIRCRAFT'S FLIGHT CONTROL SURFACE

(71) Applicant: The Regents of the University of California, Oakland, CA (US)

(72) Inventors: Ahmed Hassan, Irvine, CA (US); Haithem Taha, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 121 days.

(21) Appl. No.: 16/736,755

(22) Filed: Jan. 7, 2020

(65) Prior Publication Data
US 2020/0216167 A1    Jul. 9, 2020

Related U.S. Application Data

(60) Provisional application No. 62/789,388, filed on Jan. 7, 2019.

(51) Int. Cl.
*B64C 13/16* (2006.01)
*B64C 9/00* (2006.01)
*B64C 13/04* (2006.01)

(52) U.S. Cl.
CPC .......... *B64C 13/16* (2013.01); *B64C 9/00* (2013.01); *B64C 13/0421* (2018.01); *B64C 2009/005* (2013.01)

(58) Field of Classification Search
CPC . B64C 13/16; B64C 13/0421; B64C 13/0423; B64C 9/00; B64C 2009/005
See application file for complete search history.

(56) References Cited

U.S. PATENT DOCUMENTS

| | | | |
|---|---|---|---|
| 4,063,140 A | 12/1977 | Kammerer |
| 5,056,741 A | 10/1991 | Bliesner |
| 6,169,496 B1 | 1/2001 | Martin |
| 6,246,929 B1 | 6/2001 | Kaloust |
| 9,174,742 B2 | 11/2015 | Nelson |
| 9,218,002 B2 | 12/2015 | Schulte |
| 2010/0087970 A1 | 4/2010 | Blechen |

(Continued)

FOREIGN PATENT DOCUMENTS

WO    2000077586 A2    12/2000

OTHER PUBLICATIONS

Hassan, et al. "Geometric control formulation and nonlinear controllability of airplane flight dynamics", Nonlinear Dynamics, vol. 88, No. 4, 2017, pp. 2651-2699. Submitted twice.

(Continued)

*Primary Examiner* — Rodney A Bonnette
(74) *Attorney, Agent, or Firm* — Thomas | Horstemeyer, LLP

(57) ABSTRACT

In one embodiment, a flight control system is configured to receive one or more pilot inputs intended to effect a particular control outcome for the aircraft, receive one or more current flight parameters of the aircraft, determine whether or not the aircraft is near or in a stall, and if it is determined that the aircraft is near or in a stall, automatically control the aircraft's flight control surfaces in an oscillatory manner that increases the sensitivity of the flight control surfaces and achieves the pilot's intended control outcome.

20 Claims, 5 Drawing Sheets

(56) References Cited

U.S. PATENT DOCUMENTS

| | | | | |
|---|---|---|---|---|
| 2013/0030607 | A1* | 1/2013 | Schulte | G05D 1/0061 701/2 |
| 2016/0318601 | A1* | 11/2016 | Arnold | B64C 9/12 |
| 2019/0127079 | A1* | 5/2019 | Ribeiro | B64D 45/00 |
| 2019/0241273 | A1* | 8/2019 | Mills | B64D 43/02 |

OTHER PUBLICATIONS

Wilborn, J. and Foster, J., "Defining commercial transport loss-of-control: A quantitative approach," AIAA atmospheric flight mechanics conference and exhibt, 2004 p. 4811.

Lafferriere, G. and Sussmann, H., "Motion planning for controllable systems without drift," Robotics and Automation, 1991. Proceedings., 1991 IEEE International Conference on, IEEE, 1991, pp. 1148-1153.

Sussmann, H. J. and Liu, W., "Limits of highly oscillatory controls and the approximation of general paths by admissible trajectories," Decision and Control, 1991., Proceedings of the 30th IEEE Conference on, IEEE, 1991, pp. 437-442.

Murray, R. M. and Sastry, S. S., "Nonholonomic motion planning: Steering using sinusoids," IEEE Transactions on Automatic Control, vol. 38, No. 5, 1993, pp. 700-716.

Barraquand, J. and Latombe, J.-C., "Nonholonomic multibody mobile robots: Controllability and motion planning in the presence of obstacles," Algorithmica, vol. 10, No. 2-4, 1993, pp. 121.

Laumond, J.-P., Jacobs, P. E., Taix, M., and Murray, R. M., "A motion planner for nonholonomic mobile robots," IEEE Transactions on Robotics and Automation, vol. 10, No. 5, 1994, pp. 577-593.

Liu, W., "An approximation algorithm for nonholonomic systems," SIAM Journal on Control and Optimization, vol. 35, No. 4, 1997, pp. 1328-1365.

Sekhavat, S. and Laumond, J.-P., "Topological property for collision-free nonholonomic motion planning: The ease of sinusoidal inputs for chained form systems," IEEE Transactions on Robotics and Automation, vol. 14, No. 5, 1998, pp. 671-680.

Sussmann, H. J., "Local controllability and motion planning for some classes of systems with drift," Decision and Control, 1991., Proceedings of the 30th IEEE Conference on, IEEE, 1991, pp. 1110-1114.

Kapitanovsky, A., Goldenberg, A., and Mills, J., "Dynamic control and motion planning technique for a class of nonlinear systems with drift," Systems & control letters, vol. 21, No. 6, 1993, pp. 363-369.

Godhavn, J.-M., Balluchi, A., Crawford, L. S., and Sastry, S. S., "Steering of a class of nonholonomic systems with drift terms," Automatica, vol. 35, No. 5, 1999, pp. 837-847.

Liu, W., "Averaging theorems for highly oscillatory differential equations and iterated Lie brackets," SIAM journal on control and optimization, vol. 35, No. 6, 1997, pp. 1989-2020.

Haynes, G. and Hermes, H., "Nonlinear controllability via Lie theory," SIAM Journal on Control, vol. 8, No. 4, 1970, pp. 450-460.

Polhamus, E. C., "A Concept of The Vortex Lift of Sharp-Edge Delta Wings Based on a Leading-Edge-Suction Analogy," Tech. Rep. NASA TN D-3767, Langely Research Center, Langely Station, Hampton, VA, 1966.

Taha, H. E., Hajj, M. R., and Beran, P. S., "State-space representation of the unsteady aerodynamics of flapping flight," Aerospace Science and Technology, vol. 34, 2014, pp. 1-11.

Kwatny, H. G., Dongmo, J.-E. T., Chang, B.-C., Bajpai, G., Yasar, M., and Belcastro, C., "Nonlinear analysis of aircraft loss of control," Journal of Guidance, Control, and Dynamics, vol. 36, No. 1, 2012, pp. 149-162.

Crouch, P. E., "Spacecraft attitude control and stabilization: Applications of geometric control theory to rigid body models," Automatic Control, IEEE Transactions on, vol. 29, No. 4, 1984, pp. 321-331.

Yan, Z., et al., "Geometrically-exact unsteady model for airfoils undergoing large amplitude maneuvers," Aerospace Science and Technology, vol. 39 (2014), pp. 293-306.

* cited by examiner

SYSTEMS AND METHODS FOR CONTROLLING AN AIRCRAFT'S FLIGHT CONTROL SURFACE

CROSS-REFERENCE TO RELATED APPLICATION

This application claims priority to co-pending U.S. Provisional Application Ser. No. 62/789,388, filed Jan. 7, 2019, which is hereby incorporated by reference herein in its entirety.

BACKGROUND

Airplane stall accounts for about 46% of loss of control events in commercial fixed-wing aircraft. According to the Federal Aviation Association (FAA) "Airplane Flying Handbook," stall is defined to be an aerodynamic condition that occurs when smooth airflow over the airplane's wings is disrupted, resulting in loss of lift. Specifically, a stall occurs when the angle of attack, i.e., the angle between the chord line of the wing and the relative wind, exceeds a critical value. Stall leads to a reduction of the lift force generated by the wings and, hence, loss of altitude, which can lead to a crash if it occurs near the ground. In case of stall, pilots are advised by the FAA to execute a six-step sequence that includes applying nose-down moment to reduce the angle of attack and increasing power to reduce the loss of altitude.

Stall also leads to deterioration in the wing's flight control surface's sensitivity. Specifically, less roll is achieved for particular aileron deflections than the same deflections are used under non-stall conditions. Stall may be accompanied by an undesired rolling motion that may lead to what is called "spin/stall". While the ailerons are typically used in this situation to counteract the undesired rolling motion, the ailerons may not be effective in reversing a stall because of the deterioration in their sensitivity. In fact, the ailerons' effect may even be reversed in post-stall, which creates additional danger in that already critical situation. Moreover, stall usually leads to instabilities in the flight dynamics, which necessitate a feedback stabilizing control system. The design of such a feedback control system based on the conventional aileron input may not be possible near stall because the aileron sensitivity may become reversed and the inflexion point is typically not accurately known and possesses a stochastic nature.

BRIEF DESCRIPTION OF THE DRAWINGS

The present disclosure may be better understood with reference to the following figures. Matching reference numerals designate corresponding parts throughout the figures, which are not necessarily drawn to scale.

with $\alpha$.

Figure 2A:
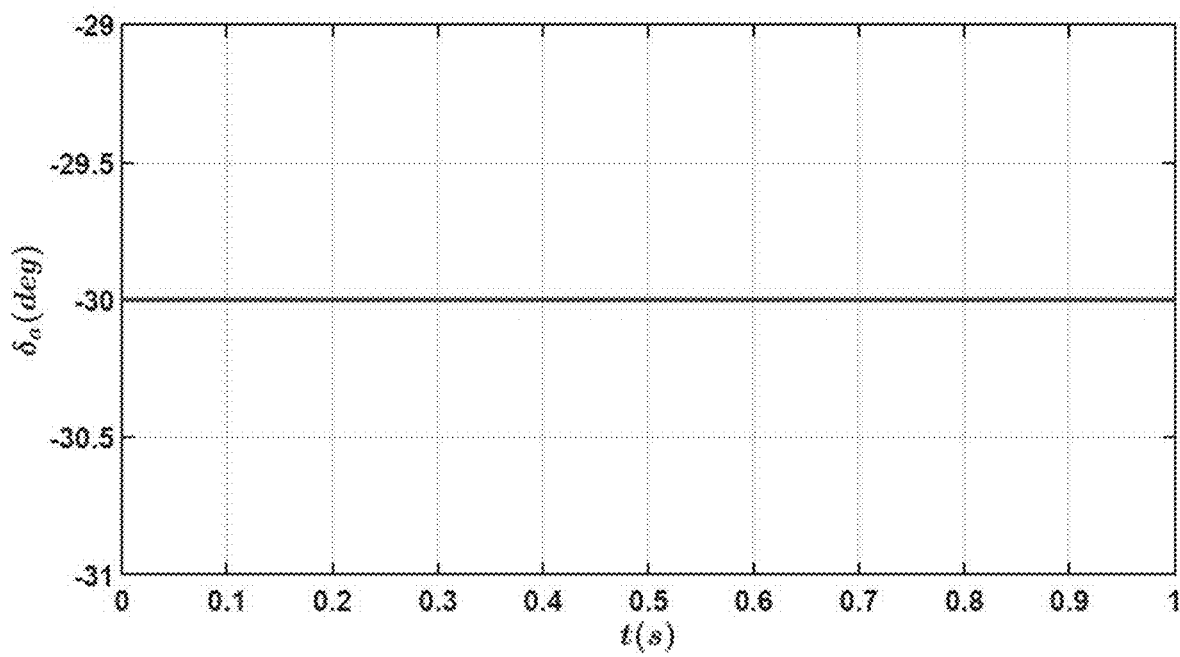

FIG. 2A is a graph that shows an aileron input that was used to evaluate the disclosed systems and methods.

Figure 2B:
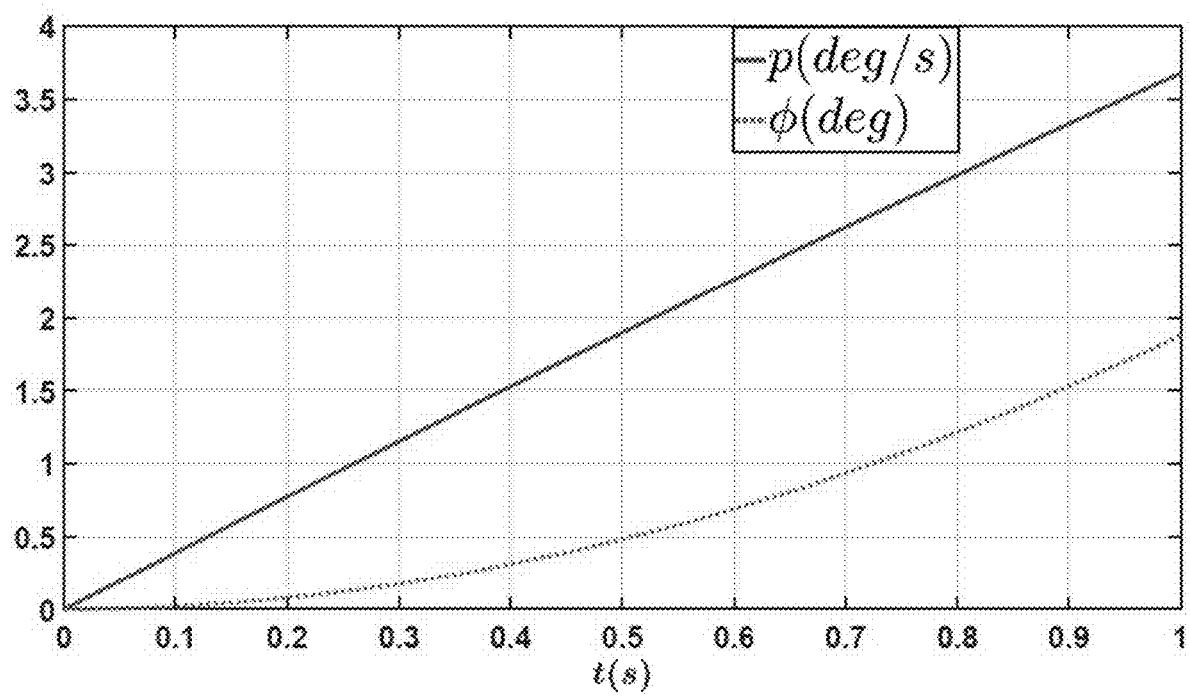

FIG. 2B is a graph that shows a numerical simulation of a three degree-of-freedom (DOF) model under the control input signals given in Eq. (16) and using the input from FIG. 2A to examine the maximum capability of the conventional roll mechanism.

Figure 3A:
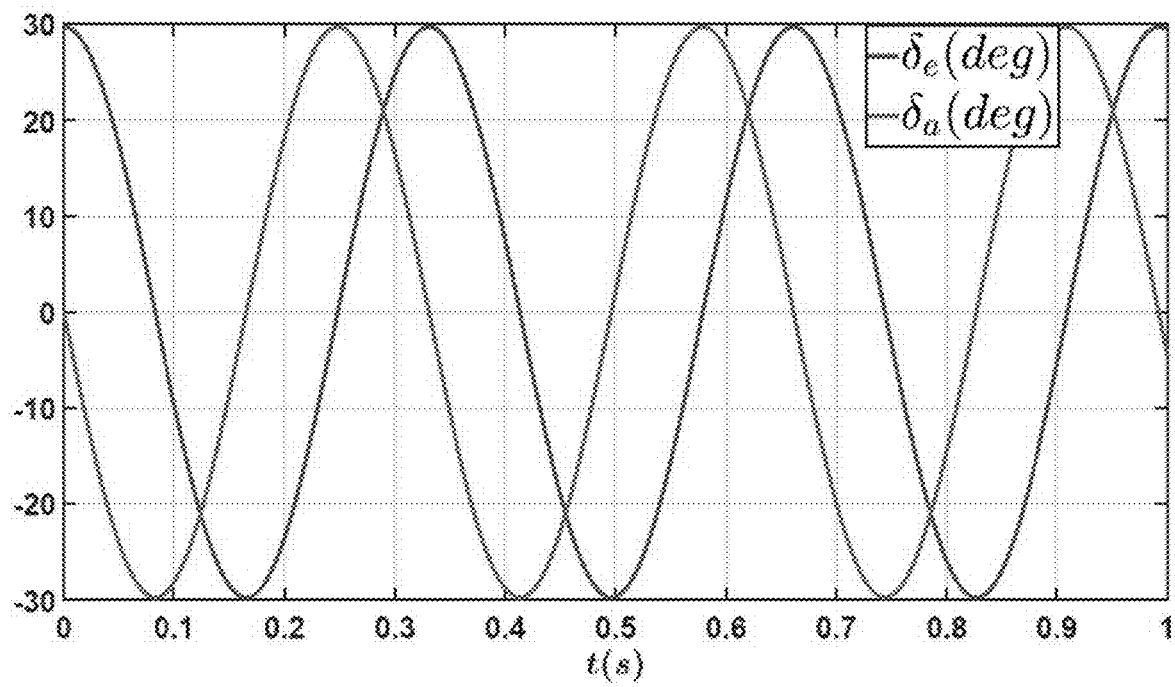

FIG. 3A is a graph that shows a further aileron input that was used to evaluate the disclosed systems and methods.

Figure 3B:
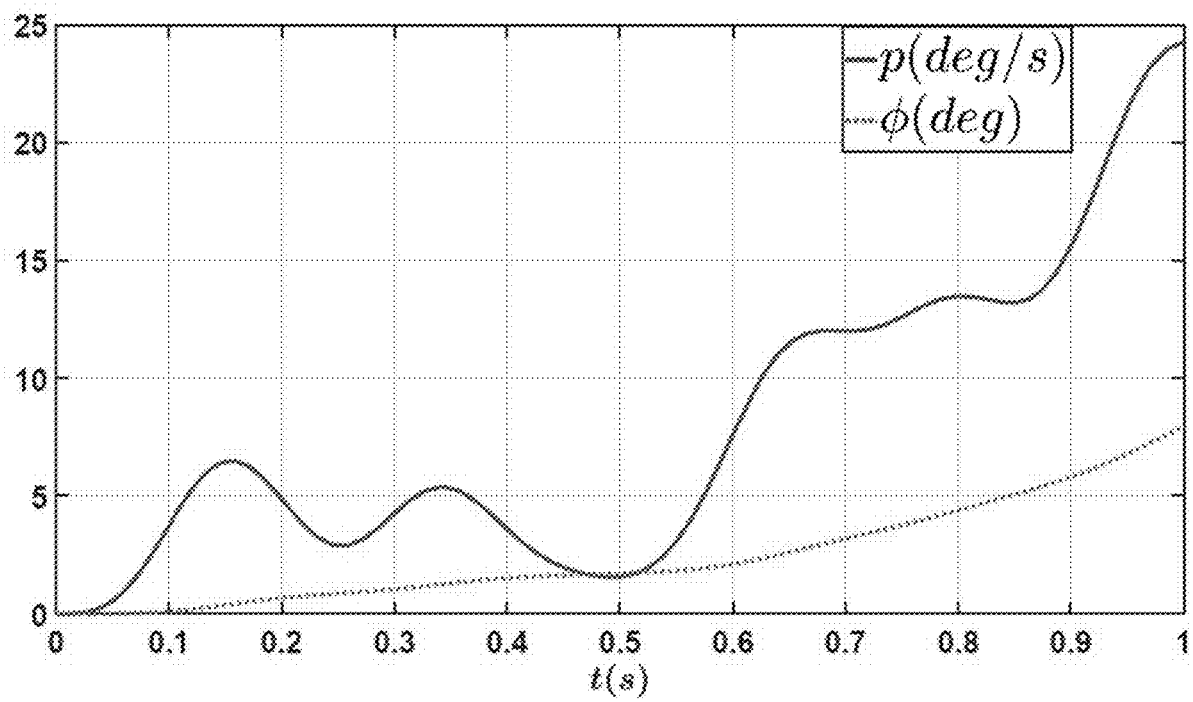

FIG. 3B is a graph that shows a numerical simulation of the three DOF model under the control input signals given in Eq. (17) and using the input from FIG. 3A to examine the maximum capability of the novel roll mechanism.

Figure 4:
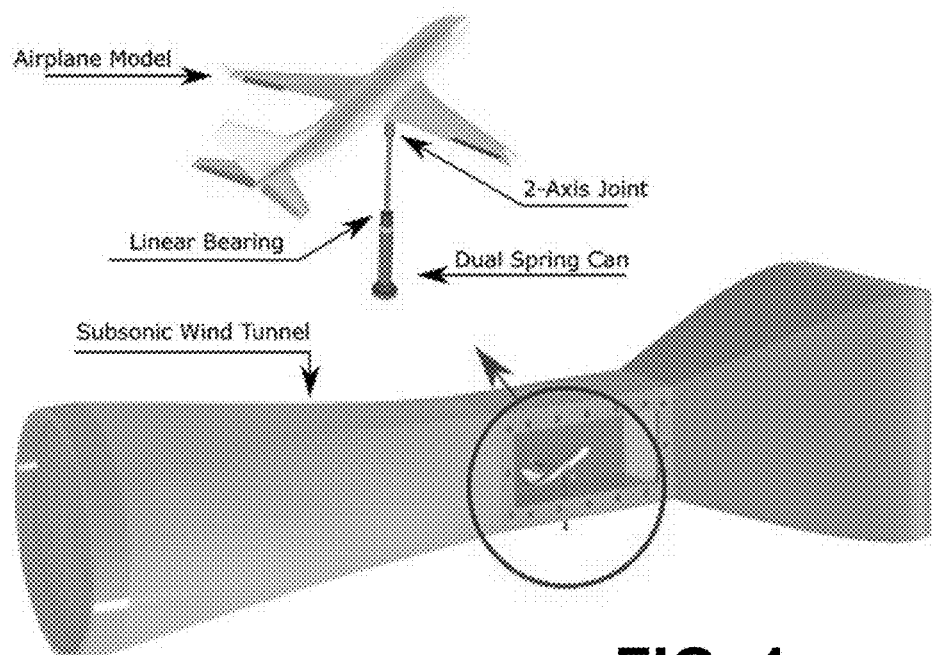

FIG. 4 is a schematic diagram illustrating the apparatus used in a wind tunnel experiment.

Figure 5:
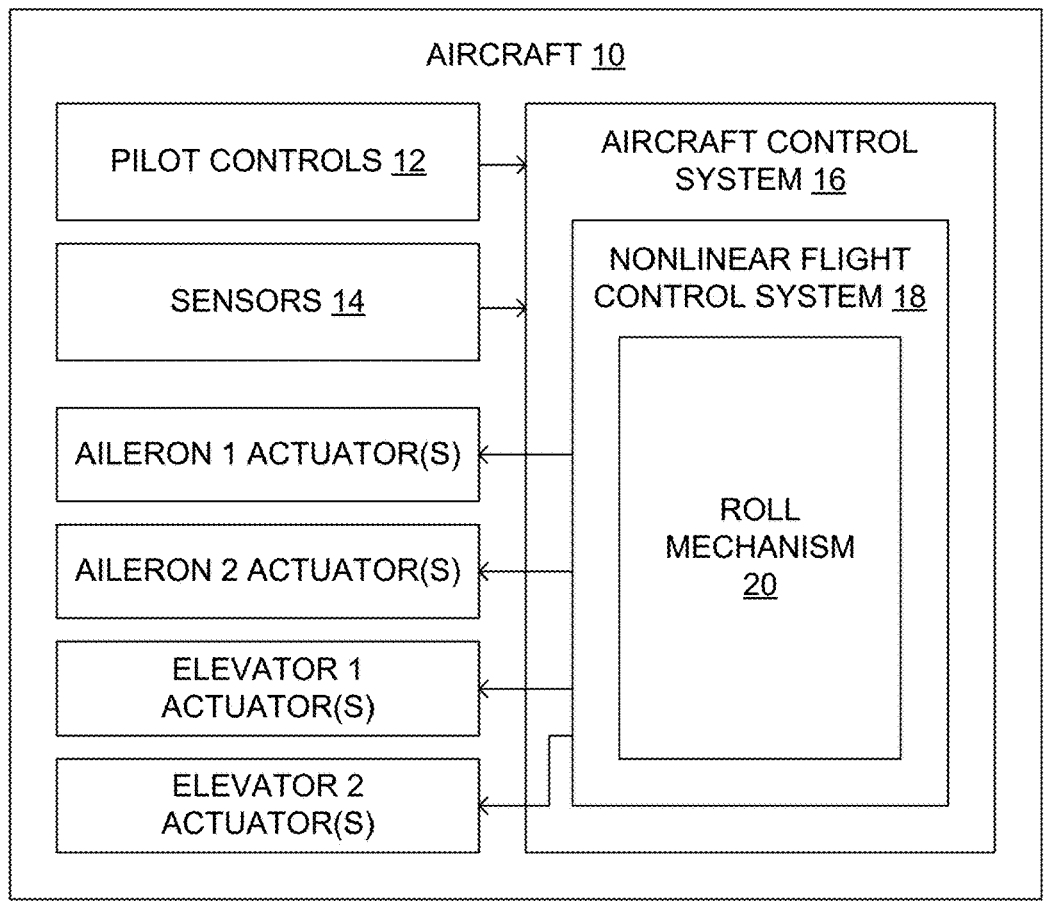

FIG. 5 is a schematic diagram illustrating an example implementation of a nonlinear flight control system.

Figure 6:
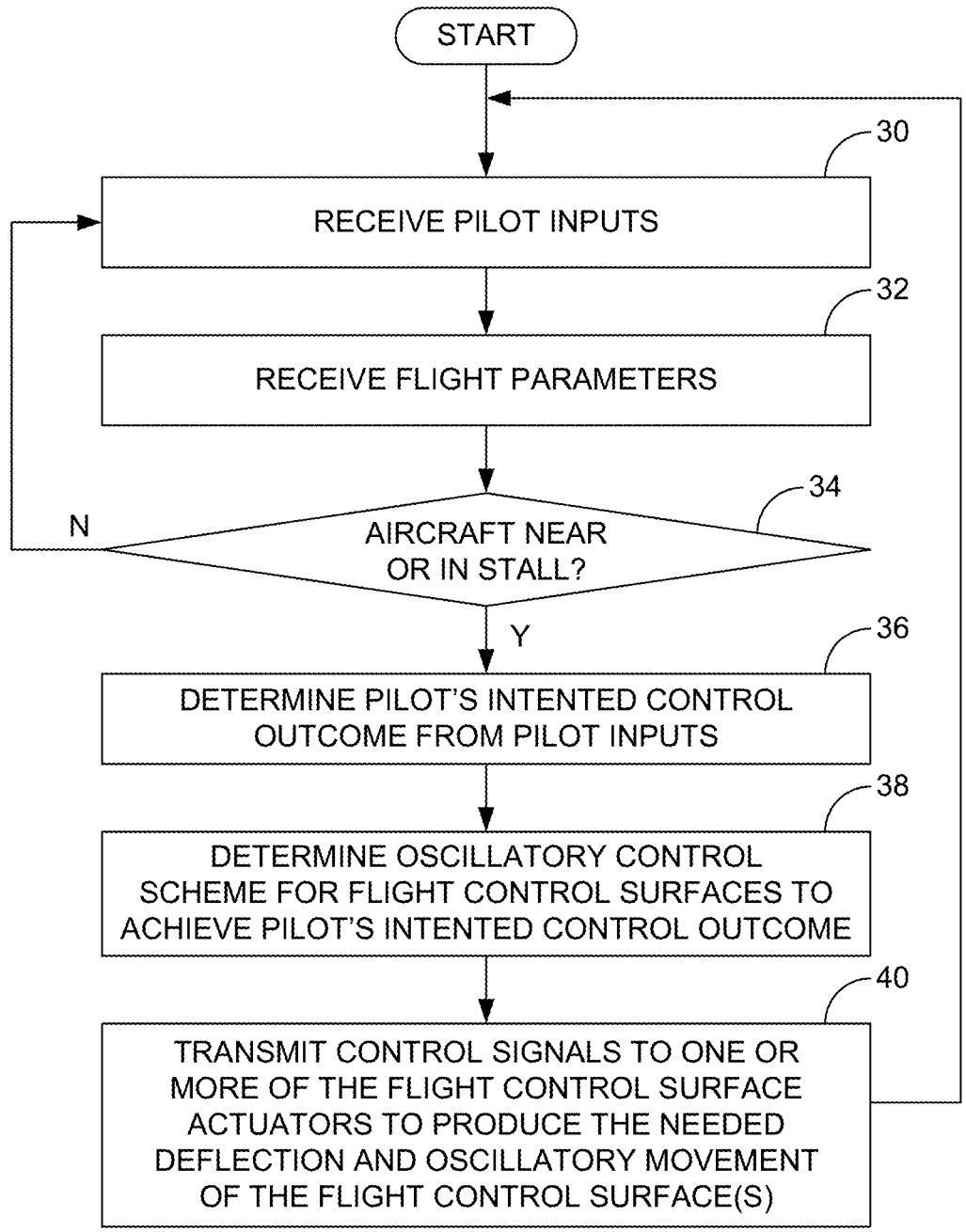

FIG. 6 is a flow diagram illustrating an example of operation of a nonlinear flight control system.

NOMENCLATURE

U, V, W=velocity components in the body frame
$V_T$=true airspeed equals $\sqrt{U^2+V^2+W^2}$
P, Q, R=angular velocity components in the body frame
$\phi$, $\theta$, $\psi$=Euler angles defining body frame with respect to an inertial frame
g=gravitational acceleration
m=aircraft mass
X, Y, Z=components of the aerodynamic force vector in the body frame
L, M, N=components of the aerodynamic moment vector in the body frame
$\bar{c}$=mean aerodynamic chord
b=wing span
S=wing area
$\delta_e$, $\delta_a$, $\delta_r$, $\delta_t$=elevator, aileron, rudder, and throttle deflections respectively
q=dynamic pressure
$\alpha$=angle of attack
$\beta$=side slip angle
$J_X$, $J_Y$, $J_Z$, $J_{XZ}$=components of the inertia matrix in the body frame

DETAILED DESCRIPTION

As noted above, stall conditions deteriorate the sensitivity of an aircraft's flight control surfaces and, therefore, the ability of those surfaces to control the aircraft, which can be especially dangerous in a "spin/stall" situation. It would, therefore, be desirable to have a system and method for controlling an aircraft's flight control surfaces that automatically accounts for such deterioration and restores the flight control surfaces' ability to control the aircraft, including counteracting a stall. Disclosed herein are examples of such systems and methods. In some embodiments, a nonlinear flight control system is configured to automatically control the flight control surfaces of the aircraft in an oscillatory manner that restores their sensitivity in or near a stall so that they can be more effectively used to control of the aircraft. In some embodiments, the parameters of the oscillatory motion, such as amplitude, frequency, and phase, are automatically controlled by the flight control system relative to one or more sensed flight parameters and the pilot's inputs. With such a system, stalls can be more effectively avoided or reversed.

The nonlinear flight control system can be used to generate roll (i.e., rotation about the aircraft's longitudinal axis) during stalls that can be used to overcome the stall and any unintended rolling that results from the stall (e.g., spin/stall).

In some embodiments, the flight control system changes the pilot's control inputs to produce oscillatory inputs to the actuators of the flight control surfaces (i.e., the aerodynamic devices that enable a pilot to adjust and control the aircraft's flight attitude, including ailerons and elevators) to generate oscillatory motion for the control surfaces. In some cases, this oscillatory motion can be used to generate more than four times as much roll angle than is possible with conventional (non-oscillatory) displacement of the flight control surfaces during a stall. Significantly, this greater control is provided without requiring anything different from the pilot. Instead, the pilot's desired control outcome (controlled roll) is inferred from the pilot's control inputs and the system automatically manipulates the flight control surfaces in an appropriate oscillatory manner to enable that outcome. Therefore, the system assists the pilot in stall conditions in a similar manner to the way that an automobile's traction/stability control system assists a driver in low-traction conditions. Notably, the flight control system can also automatically operate in cases in which the aircraft is near stall. In such case, the flight control system can help prevent the pilot from inadvertently placing the aircraft into stall. In some embodiments, the flight control system controls both the ailerons and the elevators of the aircraft in an oscillatory manner. For example, the ailerons and the elevators can be simultaneously controlled to exhibit high-frequency oscillatory movement to provide greater control over the aircraft.

As is described in greater detail below, the disclosed nonlinear flight control system incorporates a nonlinear "roll mechanism" (or "roll/yaw mechanism") that uses geometric nonlinear control theory to analyze the complex nonlinear dynamics of an aircraft in or near stall to determine how the flight control surfaces should be controlled. In some embodiments, the roll mechanism employs the concept of a Lie bracket between control inputs and a dynamic system. In such a case, there is no direct actuation leading to motion in a prescribed direction, although specific manipulation of the flight control surfaces may generate forces in a missed direction. Geometric control theory can be used to generate additional nonintuitive movements that are determined through Lie bracket operation between different control vectors. If the Lie bracket of two input vectors is linearly independent of the two generating vectors, then the implication is that, through a specific interaction between the corresponding control signals, one can generate motion along a new direction, i.e., an unactuated direction over which there is no direct control authority. The motion along some Lie bracket vectors can be realized by out-of-phase periodic signals for the corresponding inputs.

In the following discussion, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

I. Introduction

Aircraft, such as airplanes, possess rich nonlinear fight dynamics. Utilizing the nonlinearity of those dynamics could reveal unconventional ways to control/steer an airplane. In an earlier study, the inventors cast the six degrees-of-freedom (DOF) full nonlinear airplane flight dynamics in a standard nonlinear system form. Nonlinear controllability analysis was then performed using the geometric nonlinear control tools. All the possible directions of motion that could result from the interactions between different control inputs were investigated. The analysis unveiled an unconventional roll/yaw mechanism that relies on the interaction between elevator and aileron control inputs. The unconventional roll/yaw mechanism has been shown to have the potential of higher roll control authority over the conventional one (direct aileron input) at operating points near stall. A new roll/yaw mechanism that has a higher control authority than the conventional one at stall conditions could mitigate some loss of control incidents. In order to further investigate this new roll/yaw mechanism, two important questions should be answered: (i) How strong/weak is that mechanism? and (ii) How should the mechanism be executed? The first question relates to the degree of nonlinear controllability, whereas the second question is essentially a nonlinear motion planning question. The disclosure that follows is focused on answering the second question, although aspects related to the first question are discussed.

Motion planning problems (MPPs) are aimed at finding a control input history that steers a dynamic system between two arbitrarily given points. In the realm of linear motion planning, only direct control actions are used to steer the system. However, this does not apply to nonlinear motion planning where both direct control actions and Lie bracket actions may be used to steer the system. Lie bracket control action is the manipulation of two or more different control inputs to steer the system along a direction that is not directly actuated by any of those inputs. Nonlinear control-affine systems can be mathematically defined as $$\dot{x}(t) = f(x(t)) + \sum_{i=1}^{m} g_i(x(t))u_i(t) \qquad (1)$$

where x is the state vector evolving on the state-space manifold M of dimension n, f is the drift vector field, $g_{iS}$ is are the control vector fields, and $u_{iS}$ is are the control inputs. In the case f(x)=0, the system is called driftless, or, under some integrability conditions, nonholonomic. MPP was investigated for nonlinear driftless systems by researchers in the 1990s. Motion planning of nonlinearly controllable systems often requires a means to realize motions along some Lie bracket directions. A Lie bracket is a bilinear operator that takes two vector fields and returns a third vector field tangent to the same manifold, and is computed as $$[V_1(x), V_2(x)] = \frac{\partial V_2}{\partial x}V_1 - \frac{\partial V_1}{\partial x}V_2$$

In control systems, a Lie bracket between two control vector fields may result in a new direction of motion that is linearly independent of the two generating vectors (i.e., not realizable by either of the former ones). That is, a realization of a Lie bracket between two vector fields may steer the system along an unactuated direction of motion.

Motion planning of controllable nonlinear systems that have uncontrollable linearizations naturally invokes geometric control tools. Various researchers have investigated the MPP of controllable nonlinear systems without drift using geometric control tools and provided an algorithm in which piecewise constant steering controls are computed first in an extended system and then transferred to the original system. The extended system is defined to be the system constructed by adding the Lie bracket vector fields that generate new directions of motion as direct inputs. Murray and Sastry tackled the same problem using sinusoidal inputs. They defined a class of systems that can be steered using sinusoids and called it chained systems. Barraquand and Latombe, Laumond et al., and later Sekhavat and Laumond, extended the aforementioned methods to obtain motion planners that avoid path obstacles (i.e., collision-free path planners) for some classes of nonholonomic systems. Sussmann and Liu tackled the same problem, yet with a different approach. They assumed that the MPP has been solved in the extended system and they provided an algorithm that constructs a sequence of highly-oscillatory ordinary controls, such that the trajectories of the ordinary system converge to those of the extended one at high frequencies. Their results can be seen as an approximate tracking algorithm.

As an extension of these methods, there have been some attempts to solve the MPP for nonholonomic systems in the existence of a drift term. However, most of these attempts focused on the special class of dynamic extensions of nonholonomic systems where an integrator is added to the velocity input. Godhavn et al. considered a more generic class of nonholonomic systems with drift. They considered a class of Lagrangian systems with a cyclic coordinate along with bounded controls and they proved that the MPP can be solved if the controls are sufficiently large. On the other hand, Liu generalized earlier results and provided a general tracking algorithm for controllable nonlinear driftless systems. That algorithm constructs a sequence of highly-oscillatory ordinary inputs whose corresponding trajectories converge to those of the extended system at high frequencies. Moreover, Liu showed that the same algorithm is valid for some classes of nonlinear systems with drift, under some controllability conditions. That is, the algorithm can be used to generate motion along any Lie bracket direction, even in the presence of drift terms, provided that this Lie bracket involves only control vector fields. Outlined below is a framework for motion planning of a class of nonlinear systems with drift using Liu's algorithm specialized for Lie brackets that involve only two control vector fields. This framework is then used to realize a novel nonlinear roll mechanism, which may be referred to as a nonlinear flight control system and method.

II. Nonlinear Controllability

Discussed in this section is the nonlinear controllability question as motion planning cannot be performed if the system is not controllable in the first place. The nonlinear control-affine system (1) is locally accessible at $x_0$ if and only if the accessibility distribution $$C = [g_1, g_2, \ldots g_m, [g_i, g_j], \ldots, ad_{g_i}^k g_j, \ldots, [f, g_i], \ldots, ad_f^k g_i] \quad (2)$$

has rank n, where $ad_f^k g = [f, ad_f^{k-1} g]$ and $ad_f^1 g = [f, g]$. This condition is called the Lie algebraic rank condition (LARC). The accessibility property at $x_0$ implies that the set $\mathcal{R}$ of reachable points from $x_0$ has a non-empty interior. In general, accessibility is weaker than controllability. The essential difference is that, in the case of accessibility, one may be able to generate motion along some direction, but cannot reverse the motion along that direction. For driftless systems ($f(x)=0$), accessibility and controllability are equivalent.

It should be noted that the Lie brackets of the form $ad_f^k g_i$ represent direct control action and are analogous to the matrix products required for linear controllability (e.g., AB; $A^2 B$), where A is the dynamics matrix and B is the control matrix in linear systems terminology. However, the Lie brackets generated by control vector fields only (e.g., $[g_i, g_j]$) are not included in linear controllability analysis and represent indirect/nonlinear control action. Such Lie brackets can be referred to as nonlinear Lie brackets. If only Lie brackets of the form $ad_f^k g_i$ are used to satisfy the LARC, then that implies the controllability of the linearization. This is not the case if nonlinear Lie brackets are used to satisfy the LARC. In such a case, there are some directions of motion that are not directly actuated. Therefore, a means to indirectly generate motions along those directions is sought, hence the need for nonlinear motion planning techniques.

III. Motion Planning of Nonlinear Systems

Considered in this section is a nonlinearly controllable system that relies on some nonlinear Lie brackets to satisfy its LARC. This implies that such a system has some directions of motion that are not directly actuated. Therefore, the nonlinear motion planning techniques are used to find a way to indirectly generate motions along those directions. In other words, a method/algorithm is sought to realize motion along the directions of nonlinear Lie bracket vector fields. Liu provided such an algorithm for nonlinear driftless systems. He considered systems of the form $$\dot{x}(t) = \sum_{i=1}^{m} g_i(x(t)) u_i(t) \quad (3)$$

Liu then studied the relation between the trajectories of the system (3) and those of the extended system $$\dot{x}(t) = \sum_{k=1}^{r} g_k(x(t)) v_k(t), \, r > m \quad (4)$$

where the first m vector fields are the control vector fields in (3), and the vector fields $g_k$, k=m+1, ..., r are the Lie brackets of the control vector fields. In other words, Liu solved the following problem: Given a certain extended input v(t), what is the ordinary input u(t) that would generate the same trajectory as v(t)? Liu published a companion paper in which he used averaging techniques to show sufficient conditions under which the trajectories of (3) generated by sequences of ordinary inputs $u^j$ converge to trajectories of the extended system (4). It should be noted that Haynes and Hermes previously had proved that if system (3) satisfies the LARC condition, then every trajectory of (4) can be uniformly approximated by trajectories of (3). However, they did not provide a constructive procedure for producing such a sequence. Liu indicated that his algorithm could be extended to a class of nonlinear systems with drift where only Lie brackets between control vector fields are to be realized. Such a class encompasses the considered system in this disclosure. Hence, in the following subsection, a framework for motion planning/approximate tracking for this class of systems is outlined.

A. Framework for Approximate Tracking of a Class of Nonlinear Systems with Drift Consider a nonlinear systems with drift on the same form as system (1). The extended version of this class of systems can be written as $$\dot{x}(t) = f(x(t)) + \sum_{k=1}^{r} g_k(x(t)) v_k(t), \, r > m \quad (5)$$

where the vector fields $g_k$, $k=m+1, \ldots, r$ are the Lie brackets of the control vector fields that are needed to complement the accessibility distribution used to satisfy the LARC. That is, the accessibility distribution that is used to satisfy the LARC for this class of systems can be written as $$C=[g_1, g_2, \ldots, g_m, g_{m+1}, g_{m+2}, \ldots, g_r] \quad (5)$$

where the vector fields $g_{m+1}, \ldots, g_r$ are Lie brackets of control vector fields only (i.e., nonlinear Lie brackets) and are treated as direct inputs in the extended system. The framework presented here comprises two steps. The first step is to obtain the extended inputs needed to (i) steer the system from an initial point $x_0$ to a final point $x_f$; or (ii) track a desired trajectory $x_d(t)$. The second step is to employ Liu's algorithm to transform the extended inputs into ordinary inputs.

Step 1: The Extended Inputs

The matrix constructed by stacking the extended control input vector fields ($g_k$'s) together after evaluation at certain point is denoted $x \in M$ by $G(x)$. As such, the extended inputs needed to track some prescribed trajectory can be obtained as $$\upsilon(t)=G(x_d(t))^{554}\,(\dot{x}_d(t)-f(xd(t))) \quad (6)$$

where $G(x_d)=[g_1(x_d), \ldots, gr(x_d)]$, † denotes pseudo inverse, and $x_d$ is a desired trajectory in case of trajectory tracking or a suggested path that connects the initial point to the final point in case of motion planning. Note that this is not the only way to obtain the extended inputs. For example, the extended inputs could be obtained through solving an optimal control problem that minimizes certain cost function (e.g., minimum time problem).

Step 2: From Extended to Ordinary Inputs

The next step is transforming the obtained extended inputs into ordinary inputs $u_k$, for $k \in \{1, \ldots m\}$. It is particularly interesting to realize Lie brackets that involve only two vector fields (i.e., first-order Lie brackets). Consider an extended input vector field $g_{k_3}=[g_{k_1}, g_{k_2}]$ where $k_1$, $k_2, \in \{1, \ldots, m\}$. Denote the extended input associated with $g_{k_3}$ by $\upsilon_{k_3}$. Assume that $\upsilon_{k_3}(t)$ needed to track a specific trajectory over $t \in [0, T]$ has been obtained. Then, according to Liu, the motion along the Lie bracket vector field $g_{k_3}$ can be realized through the following sequence of ordinary control inputs $u_{k_1}(t)$ and $u_{k_2}(t)$ $$u_{k_1}^j(t)=-\sqrt{j}\omega\upsilon_{k_3}(t)\sin(j\omega t)$$

$$u_{k_2}^j(t)=2\sqrt{j}\cos(j\omega t) \quad (7)$$

where $\omega \in \mathbb{R} - \{0\}$, and $j$ is a positive integer. This sequence (7), when applied to the ordinary system (3), generates a trajectory that converges to that of the extended system as $j \to \infty$.

IV. Unconventional Roll Maneuver Execution Near Stall

A. Novel/Unconventional Roll/Yaw Mechanism

In an earlier effort, the inventors cast the six DOF full nonlinear airplane flight dynamics in a standard nonlinear system form. That is, the airplane flight dynamics are written as $$\dot{x}=f(x)+g_{\delta_e}(x)\delta_e+g_{\delta_a}(x)\delta_a+g_{\delta_r}(x)\delta_r+g_{\delta_t}(x)\delta_t$$

where the state vector $x=[U\ V\ W\ P\ Q\ R\ \phi\ \theta\ \varphi]^T$, $T$ denotes transpose. Then, all the possible directions of motion that could result from the interactions between different control input vector fields were investigated. The following Lie bracket vector field was found of interest $$[g_{\delta_e}, g_{\delta_a}] = \begin{bmatrix} 0 \\ 0 \\ 0 \\ \dfrac{q^2 S^2 b C_{X_{\delta_e}}(\alpha)}{m}\left(-\dfrac{C_3 W_0 \dfrac{\partial C_{\mathcal{L}_{\delta_\alpha}}}{\partial \alpha}(\alpha,\beta)}{W_0^2+U_0^2}\right) - \\ \dfrac{C_4 W_0 \dfrac{\partial C_{N_{\delta_\alpha}}}{\partial \alpha}(\alpha,\beta)}{W_0^2+U_0^2} ++ \dfrac{q^2 S^2 b C_{Z_{\delta_e}}(\alpha)}{m} \\ \left(\dfrac{C_3 \dfrac{\partial C_{\mathcal{L}_{\delta_\alpha}}}{\partial \alpha}(\alpha,\beta)}{U_0\left(\dfrac{W_0^2}{U_0^2}+1\right)} + \dfrac{C_4 \dfrac{\partial C_{N_{\delta_\alpha}}}{\partial \alpha}(\alpha,\beta)}{U_0\left(\dfrac{W_0^2}{U_0^2}+1\right)}\right) \\ \dfrac{q^2 S^2 b C_{X_{\delta_e}}(\alpha)}{m} \\ \left(-\dfrac{C_4 W_0 \dfrac{\partial C_{\mathcal{L}_{\delta_\alpha}}}{\partial \alpha}(\alpha,\beta)}{(W_0^2+U_0^2)} - \dfrac{C_9 W_0 \dfrac{\partial C_{N_{\delta_\alpha}}}{\partial \alpha}(\alpha,\beta)}{(W_0^2+U_0^2)}\right) + \\ \dfrac{q^2 S^2 b C_{Z_{\delta_e}}(\alpha)}{m} \\ \left(\dfrac{C_4 \dfrac{\partial C_{\mathcal{L}_{\delta_\alpha}}}{\partial \alpha}(\alpha,\beta)}{U_0\left(\dfrac{W_0^2}{U_0^2}+1\right)} + \dfrac{C_9 \dfrac{\partial C_{N_{\delta_\alpha}}}{\partial \alpha}(\alpha,\beta)}{U_0\left(\dfrac{W_0^2}{U_0^2}+1\right)}\right) \\ 0 \\ 0 \\ 0 \end{bmatrix} \quad (9)$$

where $$C_3 = \dfrac{J_Z}{\Gamma}, C_4 = \dfrac{J_{XZ}}{\Gamma}, C_9 = \dfrac{J_X}{\Gamma}$$

and $\Gamma = J_X J_Z - J_{XZ}^2$. Through inspection of the Lie bracket vector field $[g_{\delta_e}, g_{\delta_a}]$ (interaction between elevator and aileron) shown in Eq. (9), a new rolling and yawing mechanism was observed. That is, steady-state rolling/yawing can be obtained by zero-mean oscillating aileron and elevator deflections, provided that $$\dfrac{\partial C_{\mathcal{L}_{\delta_\alpha}}}{\partial \alpha} \text{ or } \dfrac{\partial C_{N_{\delta_\alpha}}}{\partial \alpha}$$

is nonzero. It should be noted that a Lie bracket vector field $[g_{\delta_i}, g_{\delta_j}]$ between two input vector fields $g_{\delta_i}$ and $g_{\delta_j}$ can be realized by out-of-phase square waves or sinusoids for the associated control inputs.

To inspect the efficacy of the observed new roll/yaw mechanism, the potential flow lift without leading edge suction is written as $$C_L = C_{L_\alpha} \sin\alpha \cos^2\alpha$$

where $C_{L_\alpha}$ is the lift curve slope in the linear range. As such, one has $$\frac{dC_L}{d\alpha} = C_{L_\alpha}\cos\alpha(\cos^2\alpha - 2\sin^2\alpha)$$

Therefore, since $$C_{\mathcal{L}_{\delta_a}}$$

Figure 1:
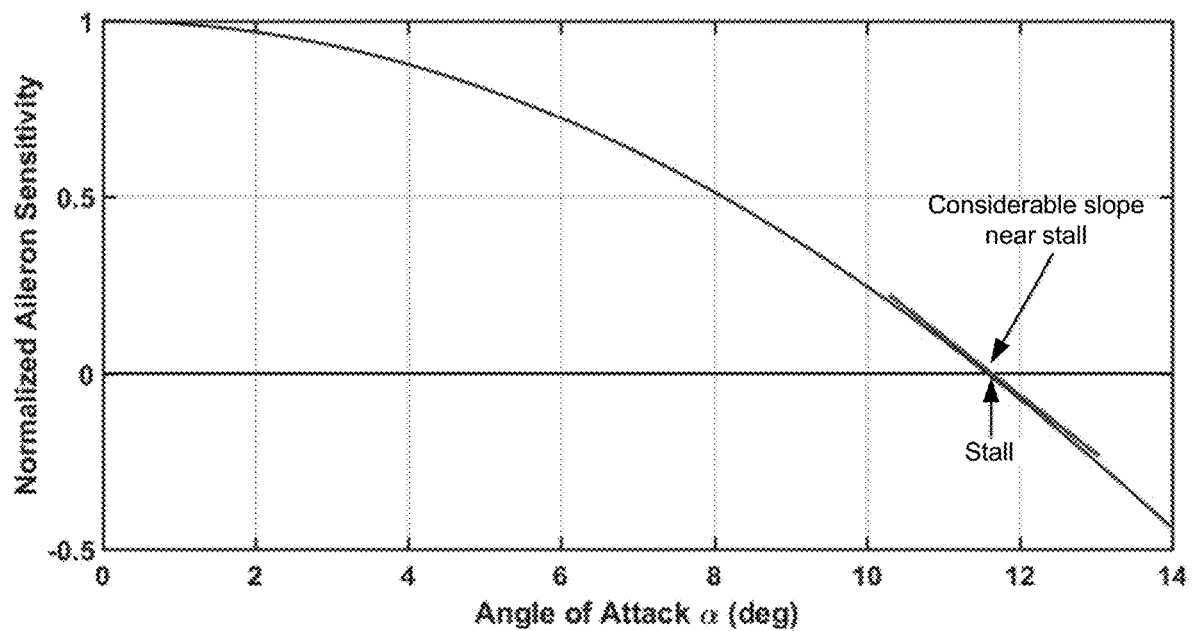
FIG. 1 is a graph that shows the variation of the normalized $$C_{L_{\delta_a}}$$

($\alpha$) is linearly dependent on $$\frac{dC_L}{d\alpha},$$

one can represent $$C_{\mathcal{L}_{\delta_a}}$$

as follows (the same analysis applies to $$C_{N_{\delta_a}})$$

$$C_{\mathcal{L}_{\delta_a}}(\alpha) = C_{\mathcal{L}_{\delta_{a0}}}\cos\alpha(\cos^2 - 2\sin^2\alpha) \quad (10)$$

where $$C_{\mathcal{L}_{\delta_{a0}}}$$

is the aileron sensitivity in the linear range. FIG. 1 shows the variation of the normalized aileron sensitivity $$\left(\text{i.e., } \frac{C_{\mathcal{L}_{\delta_a}}}{C_{\mathcal{L}_{\delta_{a0}}}}\right)$$

with angle of attack (adapted to the NASA generic transport model (GTM)). As may be expected, the normalized aileron sensitivity decreases as the angle of attack increases towards stall. However, the derivative $$\frac{\partial C_{\mathcal{L}_{\delta_a}}}{\partial \alpha},$$

which represents the sensitivity of the new roll mechanism, has a considerable value near stall. As such, the new roll mechanism may be suitable in high angle of attack situations, such as stall recovery situations. It should be noted that this is a novel nonlinear mechanism that is not related to Crouch's theorem, which is concerned with single input.

B. Reduced-Order Three DOF Model

In this disclosure, the focus is on the rolling capability of the new roll/yaw mechanism. As such, in order to accurately assess the effectiveness of new roll mechanism, a reduced-order three DOF flight dynamics model is developed that possesses the minimal degrees of freedom needed to demonstrate its rolling capability. Then, the analyses is performed on a three DOF model. This model resembles a wind tunnel experiment (explained in detail below) that is developed to verify the results. The three degrees of freedom included in this model are: heaving motion (z, W) constrained by a spring force, roll ($\phi$, P), and pitch ($\theta$, Q). The three DOF flight dynamics model can be written in a standard nonlinear system form as $$\frac{d}{dt}\begin{bmatrix} z(t) \\ \phi(t) \\ \theta(t) \\ W(t) \\ P(t) \\ Q(t) \end{bmatrix} = \begin{bmatrix} W \\ P + Q\tan\theta\sin\phi \\ Q\cos\phi \\ -g - \frac{qS}{m}C_Z(\alpha) - \frac{qS}{2m}\frac{\tau}{V_T}\frac{C_{Z_Q}(\alpha)}{\cos\alpha}Q - \frac{k_s}{m}z \\ C_2 PQ + C_3 qSb\left(C_{\mathcal{L}}(\alpha) + \frac{b}{2V_T}C_{\mathcal{L}_P}(\alpha)P\right) \\ -C_6 P^2 + C_7 qS\tau\left(C_M(\alpha) + \frac{\tau}{2V_T}C_{MQ}(\alpha)Q\right) \end{bmatrix} + \quad (11)$$

$$\begin{bmatrix} 0 \\ 0 \\ 0 \\ \frac{qS}{m\cos\alpha}C_{Z_{\delta_e}}(\alpha) \\ 0 \\ C_7 qS\bar{c}C_{M_{\delta_e}}(a) \end{bmatrix}\delta e + \begin{bmatrix} 0 \\ 0 \\ 0 \\ 0 \\ C_3 qSbc_{\mathcal{L}_{\delta_a}}(a) \\ 0 \end{bmatrix}\delta_\alpha$$

where $k_S$ is the spring stiffness, $$C_2 = \frac{(J_X - J_Y + J_Z)J_{XZ}}{\Gamma}, C6 = \frac{J_{XZ}}{J_Y}, \text{ and } C7 = \frac{1}{J_Y}.$$

The system (11) can alternatively be written in an abstract form as $$\dot{x} = f(x) + g_{\delta_e} 30 \, g_{67_\alpha}(x)\delta_\alpha (12)$$

where the state vector $x = [z \ \phi \ \theta \ W \ P \ Q]^T$.

C. Fliess Functional Expansion for the Roll Rate Output

In order to understand the various nonlinear effects induced by the aileron and elevator inputs on the roll rate, an input-output representation for the three DOF system described above is developed. Such a representation can be developed using the Fliess functional expansion. An output $y_j(t) = h_j(x(t))$ of the nonlinear system (1) can be written as $$y_j(t) = h_j(x_0) + \sum_{k=0}^{\infty}\sum_{i_0,\ldots,i_k=0}^{m} L_{g_{i_0}}\ldots L_{g_{i_k}}\, h_j(x_0)\int_0^\tau d\xi_{i_k}\ldots d\xi_{i_0} \quad (13)$$

where $g_0 = f$, $L_g h$ is the Lie derivative of h along g, and $i_0, \ldots, i_k$ is a multi-index of length k. Writing the Fliess series expansion (13) of the roll rate output P(t) of system (11), or alternatively (12), and truncating after two terms, one obtains the following non-zero terms $$P(t) = P_0 + L_{g_{\delta_\alpha}} P(x_o) \int_0^T \delta_\alpha(\tau) d\tau + \qquad (14)$$

$$L_{g_{\delta_\alpha}} L_f P(x_0) \int_o^T \int_0^\tau \delta_\alpha(s) ds d\tau + + L_f L_{g_{\delta_\alpha}} P(x_o) \int_0^T \delta_\alpha(\tau) \tau d\tau +$$

$$L_{g_{\delta_\alpha}} P(x_0) \int_o^T \delta_\alpha(\tau) \int_o^\tau \delta_e(s) ds d\tau$$

It should be noted that the Lie bracket responsible for the new roll mechanism ($[g_{\delta_e}, g_{\delta_\alpha}]$) can be written in terms of Lie derivatives as $$[g_{\delta_e}, g_{\delta_\alpha}] = L_{g_{\delta_e}} L_{g_{\delta_\alpha}} - L_{g_{\delta_\alpha}} L_{g_{\delta_e}}$$

However, since $$L_{g_{\delta_\alpha}} L_{g_{\delta_e}} P = 0,$$

the effect of the Lie bracket $[g_{\delta_e}, g_{\delta_\alpha}]$ is solely represented in the term $$L_{g_{\delta_\alpha}} L_{g_{\delta_e}} P.$$

Hence, the Fliess functional expansion truncation in Eq. (14) signifies the roles of both the direct aileron action (i.e., commanding only $\delta_\alpha$ input) and the $[g_{\delta_e}, g_{\delta_\alpha}]$ Lie bracket action in executing a roll maneuver.

For the remainder of this disclosure, the NASA generic transport model (GTM) is used for analysis. The NASA GTM is a 5.5% dynamically scaled commercial transport model along with a nonlinear aerodynamic model that represents the aerodynamic coefficients and stability derivatives as polynomials in the angle of attack $\alpha$ and sideslip angle $\beta$. A near-stall trim point, $x_0=[0\ 0\ \alpha_0\ 0\ 0\ 0]^T$, is considered where $\alpha_0=11:46°$. As such, the parameters included in the Fliess functional expansion truncation (14) are estimated as follows $$L_{g_{\delta_\alpha}} P(x_0) = -0.131$$

$$L_{g_{\delta_\alpha}} L_f P(x_0) = 0.017$$

$$L_f L_{g_{\delta_\alpha}} P(x_0) = 4.33 \cdot 10^{-15}$$

$$L_{g_{\delta_e}} L_{g_{\delta_\alpha}} P(x_0) = -12.074$$

It is observed that the $[g_{\delta_e}, g_{\delta_\alpha}]$ Lie bracket action seems to have a higher control authority at the considered trim point than the direct aileron action. However, the total effect on the roll rate could be different when the iterated integrals are evaluated and taken into account. Such a comparison is considered in the next section.

D. Comparison between the Novel and Conventional Roll Mechanisms

In this subsection, two different methods to execute a roll maneuver at the considered near-stall trim point are considered and a comparative study between them while using NASA GTM parameters is conducted. The first method is to command fixed-aileron detection for a specific amount of time (i.e., the conventional roll mechanism), whereas in the second method, the appropriate sinusoid signals (guided by the framework explained in Sec. III) are commanded for both the aileron and the elevator that would realize motion along the direction of the Lie bracket vector field $[g_{\delta_e}, g_{\delta_\alpha}]$ (i.e., the new roll mechanism). For both methods, the aileron and elevator deflections are considered to be bounded between −30° and 30°. The two methods are first compared through investigation of the Fliess functional expansion of the roll output shown in Eq. (14). Numerical simulations are then performed for both methods.

To examine the maximum capability of the conventional roll mechanism, consider the following control input signals $$\delta_e(t)=0$$

$$\delta_\alpha(t)=-30° \qquad (16)$$

Since the input-output representation in Eq. (14) is valid only in the vicinity of the considered equilibrium point, an excursion time of T=0.5 sec is considered. It should be noted that by commanding only $\delta_\alpha$ input, the effect of the last term in Eq. (14) would vanish. As such, evaluating the first three terms, one obtains P(0.5)=1:898 deg/s. Now, the maximum capability of the novel roll mechanism can be examined. Inspired by the control input sequence shown in Eq. (7), the following input signals are used for aileron and elevator inputs to realize the motion along the direction of the Lie bracket vector field $[g_{\delta_e}, g_{\delta_\alpha}]$ $$\delta_e(t)=2k_e\sqrt{j}\cos(j\omega t)$$

$$\delta_\alpha(t)=-k_\alpha\sqrt{j\omega}\sin(j\omega t) \qquad (17)$$

where j is chosen to be equal to 19 and $\omega=1$, which renders an oscillation frequency of 3 Hz. $k_e$ and $k_\alpha$ are chosen so that the input signals do not exceed the bounds (i.e., $\delta_e$, $\delta_a \in [-30°, 30°]$). Hence, $k_e=0.0595$ and $k_\alpha=0.119$. As such, evaluating the roll output after the excursion time, one obtains P(0.5)=2.825 deg/s. It is noted that about 50% more roll rate was achieved using the novel roll mechanism's control inputs, given in Eq. (17).

Next, numerical simulations are performed for both cases using the three DOF model (11). The simulations are started at the same initial condition $x_0$ used to examine the Fliess functional expansion of the roll output. FIGS. 2 and 3 show the control input history along with the roll output over one second using the conventional roll mechanism and the novel one, respectively. Inspecting the simulation results, one can observe that the roll angle reached 8° at the end of the one-second maneuver when using the novel roll mechanism, as opposed to only 1.9° roll angle for the conventional roll mechanism (constant aileron deflection). That is, the novel roll mechanism is able to generate more than four times as much roll as the conventional one is capable of at this operating point. This result complies with what was noted earlier from the Fliess functional expansion of the roll output. Hence, it is concluded that the discovered new Lie-bracket roll mechanism is superior to the conventional one at near-stall operating conditions.

V. Experimental Demonstration

In this section, a wind tunnel experiment is described that was developed to verify the obtained results for the novel roll mechanism. FIG. 4 shows a schematic diagram for the experiment apparatus. The experiment comprised a sub-scale airplane model of a commercial transport airplane that was placed on a test rig that enables pitch and roll but not yaw. Heaving motions are also allowed but were constrained through a tension spring. The airplane model was trimmed at a near-stall angle of attack and the aileron and elevator were controlled with sinusoid control signals to realize the Lie-bracket roll mechanism, as explained in Section IV. The roll response was measured through an inertial measurement unit and logged into a computer for further analysis. The same experiment was repeated while controlling affixed aileron deflection (i.e., the conventional roll mechanism). Responses from both mechanisms are then compared.

VI. Conclusions

A three DOF flight dynamics model has been developed to perform a comprehensive investigation of a novel roll mechanism that was developed by the inventors and that can be integrated into a flight control system used in an aircraft. This novel roll mechanism is executed by determining the Lie bracket between elevator and aileron control vector fields. Determining the motion along the direction of a Lie bracket vector field in a nonlinear system with drift invokes tools from geometric control theory. Hence, the geometric control theory literature was relied upon and a framework for approximate trajectory tracking for a class of nonlinear systems with drift, specialized to only first-order Lie brackets, was outlined. Employing this framework, and using the NASA GTM for analysis and simulation, the maximum capability of the novel roll mechanism near stall has been examined and compared to that of conventional control (i.e., direct aileron action). The simulation results indicate a superiority of the new roll mechanism relative to conventional mechanisms at near-stall operating points at which aileron sensitivity degrades. In particular, the novel roll mechanism was able to generate more than four times as much roll as the conventional mechanism at the same operating point. Analysis of the Fliess functional expansion of the roll output complied with the simulation results. Further, the developed framework in Section III has been employed in order to track a desired roll trajectory near stall. Trajectory tracking simulation results indicate the need for high input frequency if high tracking accuracy is sought. However, high input frequency may not be feasible for real systems due to the actuator and structural limitations. Hence, the provided framework is considered as an approximate trajectory tracking method for such systems.

VII. Practical Applications

The above-described control scheme can be integrated into a nonlinear flight control system for use with an aircraft. The flight control system can be added to whatever existing control systems an existing aircraft already possesses (in a retrofitting application), or can be integrated into the overall control system for the aircraft during its development (an original equipment application). In either case, the nonlinear flight control system is configured to collect data that is useful in controlling the flight control surfaces of an aircraft and, therefore, the flight of the aircraft, including preventing or recovering from a stall. Such data can include one or more flight parameters, such as the angle of attack, airspeed, roll angle, pitch angle, and yaw angle. In some embodiments, one or more of these flight parameters can be obtained from the aircraft's inertial measurement unit, which can include one or more accelerometers, gyroscopes, and magnetometers. Other data that the flight control system can be configured to collect includes pilot control inputs intended to control the flight of the aircraft, such as the position and orientation of the aircraft's control wheel, control stick, or other control device that is used to control the orientation of the aircraft. In some embodiments, the flight control system is automatically activated when the aircraft reaches or exceeds a predetermined threshold for one or more of the aforementioned flight parameters. For example, if the angle of attack reaches or exceeds a predetermined angle of attack that is near, at, or beyond the "critical" angle of attack at which a stall is likely, the flight control system, and its integrated roll mechanism, can automatically assist the pilot by implementing oscillatory motion of the flight control surfaces, such as the ailerons and/or elevators, to ensure the control outcome the pilot is seeking.

FIG. 5 is a block diagram that schematically illustrates an example implementation of a nonlinear flight control system in accordance with the above disclosure. As shown in FIG. 5, an aircraft 10, such as a fixed-wing airplane, include pilot controls 12, one or more sensors 14, and an aircraft control system 16. While such an application is the focus of the discussion presented in this disclosure, it is noted that an oscillatory control scheme can be applied to other aircraft, including helicopters. As noted above, the controls 12 include those controls that are used to operate and actuate flight control surfaces of the aircraft 10, such as a control wheel, control stick, or other control device. The flight control surfaces can, for example, include ailerons provided on wings of the aircraft (e.g., one aileron per wing) and elevators provided on a fixed horizontal stabilizer of the aircraft (e.g., one elevator per side of the horizontal stabilizer). It is also noted that other flight control surfaces could be controlled using an oscillatory control scheme. For example, in terms of an airplane, the rudder could additionally or alternatively be controlled in this manner. Furthermore, oscillatory control can be extended to flight control devices beyond what is strictly defined as flight control "surfaces." For example, a similar control scheme could be applied to other flow controls, such as synthetic jets, to some aspect of the aircraft's flight. As also noted above, the sensors 14 can comprise an inertial measurement unit or other sensors that are configured to collect flight parameters, such as the angle of attack, airspeed, roll angle, pitch angle, and yaw angle.

With further reference to FIG. 5, the aircraft control system 16 incorporates a nonlinear flight control system 18 that implements a roll mechanism 20 of the type described in detail above. The flight control system 18 and its roll mechanism 20 can comprise both hardware and software that are used to execute the desired functionality. For example, in some embodiments, the nonlinear flight control system 18 can be implemented as an independent control module that includes one or more processing devices (e.g., microprocessors) and one or more software programs that include various instructions that can be executed by the one or more processing devices. At least some of these "computer-executable" instructions (i.e., computer logic) can be comprised by one or more algorithms that also can be executed by the one or more processing devices. The control module, when provided, can further include a non-transitory computer- readable medium upon which the one or more software programs are stored.

Irrespective of its particular configuration, the nonlinear flight control system 18 is configured to receive data, including pilot control inputs entered using the pilot controls 12 as well as current flight parameters sensed by the sensors 14, and determine whether or not the system is needed to operate the flight control surfaces. Such intervention can be performed if one or more of the flight parameters indicates that the aircraft is near or in stall. If so, the flight control system 18 can automatically control the flight surfaces in a manner that both achieves the pilot's desired control outcome (as inferred by the pilot inputs) in a manner that increases the sensitivity and, therefore, effectiveness, of the flight control surfaces, which otherwise may not be effective in achieving that outcome. In such a case, the flight control system 18 can transmit control instructions to actuators of the flight control surfaces to operate those surfaces in the manner that is determined to best control the aircraft 10. In the example of FIG. 5, these actuators include aileron actuators configured to actuate (displace) first and second ailerons of the aircraft 10, and elevator actuators configured to actuate (displace) first and second elevators of the aircraft.

As described above, the conventional methods of avoiding or recovering from a stall, especially a spin/stall, become much less effective as the angle of attach nears, reaches, or exceeds the critical angle of attack. For example, if the pilot were to operate the ailerons in a conventional manner an attempt to roll the aircraft to avoid or recover from a stall, the ailerons may not be effective in producing such roll due to deterioration in their sensitivity due to the near-stall or stall conditions. In such a case, the disclosed nonlinear flight control system can automatically control the flight control surfaces in an oscillatory manner to ensure the desired outcome is achieved. FIG. 6 is a flow diagram that illustrates an example of continuous operation of the nonlinear flight control system in assisting the pilot in controlling an aircraft.

Beginning with blocks 30 and 32, the pilot's inputs and the sensed flight parameters are received by the nonlinear flight control system. At this point, which may occur at a periodic time interval, the flight control system determines whether or not the aircraft is near or in stall, as indicated in block 34. In some embodiments, this determination is primarily made in relation to the aircraft's angle of attack. If the critical angle of attack at which the aircraft is likely to stall is known, the flight control system can be configured to activate if the sensed angle of attack is greater than or equal to a threshold angle of attack that is near the critical angle of attack, such as 1 to 5 degrees below the critical angle of attack. For example, if it is known that a given aircraft's critical angle of attack is 15 degrees, the flight control system can be configured to activate (and therefore assist the pilot in controlling the aircraft) at a threshold of 12 degrees, 13 degrees, or 14 degrees. In some embodiments, the angle at which the flight control system activates can be set by the manufacturer or maintainer of the aircraft.

If the flight parameters are such that they indicate that the aircraft is not near or in stall, flow returns to blocks 30 and 32 at which further data is received. If, on the other hand, the flight parameters indicate that the aircraft is in fact near or in stall conditions, the flight control system is activated and flow continues to block 36. At block 36, the flight control system determines the pilot's intended control outcome from the pilot's inputs. For example, the flight control system can infer the manner in which the pilot is trying to pitch and roll the aircraft to avoid or recover from a stall. As described above, the pilot may not be able to achieve such control with such inputs if the aircraft is near or in stall as the sensitivity of the flight control surfaces may have degraded due to the flight conditions. In such a case, the flight control system determines an oscillatory control scheme with which to control the flight control surfaces to achieve the pilot's intended control outcome, as indicated in block 38. As described in detail above, this comprises determining (calculating) a nonlinear Lie bracket between a first control input (e.g., for the ailerons) and a second control input (e.g., for the elevators), i.e., two different control vector fields, to determine (calculate) a third control input (i.e., third vector field) that can be used steer the aircraft along an unactuated direction of motion.

In some embodiments, the oscillatory control scheme is one in which the oscillatory motion of the flight control surfaces has zero mean, meaning that the surface is oscillated about a given angle of deflection at which the control surface is positioned and the oscillations provide no net deflection for the control surface. While one might intuitively assume that such zero-mean oscillation would have little impact in relation to controlling the aircraft, the effect can dramatically increase the ability with which the control surfaces can change the orientation of the aircraft. This is especially the case with the interactions between two zero-mean oscillating flight control surfaces, such as an aileron and an elevator, as those interactions produce a net rolling motion of the aircraft. In determining how to control the control surfaces, the flight control system determines both the angles of deflection at which the control surfaces should be positioned as well as the manner in which the control surfaces should be oscillated to obtain the desired outcome.

In some embodiments, both forward control surfaces, such as the ailerons, and the rearward control surfaces, such as the elevators, are simultaneously operated 90 degrees out-of-phase from each other. For example, if the elevators are positioned at their maximum positive position (i.e., both elevators positioned at their maximum upward angle), the ailerons are in their neutral position (i.e., the ailerons are not angled upward or downward). If, however, the elevators are in their neutral position, the ailerons are in their maximum positive position (i.e., the right aileron is at its maximum upward position and the left aileron is at its maximum downward position). When the elevators are at their maximum negative position (i.e., both elevators positioned at their maximum downward angles), then the ailerons are in their maximum negative position (i.e., the right aileron is at its maximum downward position and the left aileron is at its maximum upward position. The nature of the oscillatory movement has been discussed in detail above. From that discussion, it can be appreciated that the flight control system determines (calculates) the various parameters of the oscillations, such as the amplitude (magnitude of displacement), frequency, and phase of the oscillations for each of the flight control surfaces. It can further be appreciated that the oscillatory motion can be described as sinusoidal, harmonic, or periodic.

Referring next to block 40, once the flight control system has determined the correct oscillatory control parameters for the flight control surfaces, the system can transmit control signals to one or more of the flight control surface actuators so that they can displace and oscillate the control surfaces in the manner determined by the flight control system. Through such control, a stall can be avoided or reversed and normal flight can be restored. Regardless, flow can return again to blocks 30 and 32 at which new data is collected by the flight control system and a new determination is made as to whether assistance is needed or not.

The invention claimed is:

1. A flight control system configured to control an aircraft's flight control surfaces, the system comprising:
   a roll mechanism configured to:
      receive one or more pilot inputs intended to effect a particular control outcome for the aircraft,
      infer the pilot's intended control outcome based upon the one or more pilot inputs;
      receive one or more current flight parameters of the aircraft,
      determine whether or not the aircraft is near or in a stall, and
      if it is determined that the aircraft is near or in a stall, automatically control the aircraft's flight control surfaces actuators to operate the aircraft's flight control surfaces in an oscillatory manner that increases the sensitivity of the flight control surfaces and achieves the pilot's intended control outcome.

2. The system of claim 1, wherein the one or more pilot inputs are inputs that were made by the pilot using a control wheel or stick of the aircraft.

3. The system of claim 1, wherein the flight parameters include one or more of the angle of attack, airspeed, roll angle, pitch angle, and yaw angle of the aircraft.

4. The system of claim 1, wherein the flight parameters include the angle of attack.

5. The system of claim 1, wherein the roll mechanism is configured to determine whether or not the aircraft is near or in a stall by determining whether or not a current angle of attack meets or exceeds a threshold angle of attack that is near a critical angle of attack of the aircraft.

6. The system of claim 1, wherein the flight control surface the roll mechanism is configured to control in an oscillatory manner includes at least one aileron of the aircraft.

7. The system of claim 1, wherein the flight control surface the roll mechanism is configured to control in an oscillatory manner includes at least one elevator of the aircraft.

8. The system of claim 1, wherein the flight control surface the roll mechanism is configured to control in an oscillatory manner includes ailerons and elevators of the aircraft.

9. The system of claim 8, wherein the roll mechanism is configured to control at least one aileron in a manner in which it is positioned 90 degrees out-of-phase relative to at least one elevator.

10. The system of claim 1, wherein the roll mechanism is configured to control both the angles of deflection and oscillatory motions for each of the flight control surfaces.

11. An aircraft comprising:
flight control surfaces;
flight control surface actuators configured to operate the flight control surfaces;
a pilot control device configured to control an attitude of the aircraft;
one or more sensors configured to sense one or more current flight parameters of the aircraft; and
a flight control system configured to:
receive one or more pilot inputs entered using the pilot control device, the inputs intended to effect a particular control outcome for the aircraft,
infer the pilot's intended control outcome based upon the one or more pilot inputs;
receive one or more current flight parameters of the aircraft from the one or more sensors,
determine whether or not the aircraft is near or in a stall, and
if it is determined that the aircraft is near or in a stall, automatically control the aircraft's flight control surfaces actuators to operate the aircraft's flight control surfaces in an oscillatory manner that increases the sensitivity of the flight control surfaces and achieves the pilot's intended control outcome.

12. A method for controlling flight control surfaces of an aircraft, the method comprising:
receiving one or more pilot inputs intended to effect a particular control outcome for the aircraft;
inferring the pilot's intended control outcome based upon the one or more pilot inputs;
receiving one or more current flight parameters of the aircraft;
determining whether or not the aircraft is near or in a stall; and
if it is determined that the aircraft is near or in a stall, automatically controlling the aircraft's flight control surface actuators to operate the aircraft's flight control surfaces in an oscillatory manner that increases the sensitivity of the flight control surfaces and achieves the pilot's intended control outcome.

13. The method of claim 12, wherein receiving one or more current flight parameters comprises receiving one or more of the angle of attack, airspeed, roll angle, pitch angle, and yaw angle of the aircraft.

14. The method of claim 12, wherein receiving one or more current flight parameters comprises receiving the angle of attack.

15. The method of claim 12, wherein determining whether or not the aircraft is near or in a stall comprises determining if a current angle of attack meets or exceeds a threshold angle of attack that is near a critical angle of attack of the aircraft.

16. The method of claim 12, wherein controlling the aircraft's flight control surfaces comprises controlling at least one aileron of the aircraft.

17. The method of claim 12, wherein controlling the aircraft's flight control surfaces comprises controlling at least one elevator of the aircraft.

18. The method of claim 12, wherein controlling the aircraft's flight control surfaces comprises simultaneously controlling ailerons and elevators of the aircraft.

19. The method of claim 18, wherein simultaneously controlling ailerons and elevators comprises controlling at least one aileron so that it is positioned 90 degrees out-of-phase relative to at least one elevator.

20. The method of claim 12, wherein controlling the aircraft's flight control surfaces comprises controlling both the angles of deflection and oscillatory motions for each of the flight control surfaces.

* * * * *